US012756930B2

(12) United States Patent
Huang et al.

(10) Patent No.: US 12,756,930 B2
(45) Date of Patent: Oct. 6, 2026

(54) PHASE-DIFFERENCE-BASED MACRO FOCUSING METHOD AND APPARATUS FOR CAMERA LENS

(71) Applicant: HUIZHOU TCL MOBILE COMMUNICATION CO., LTD., Huizhou (CN)

(72) Inventors: Jing Huang, Huizhou (CN); Lu Zhang, Huizhou (CN); Yi Liu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 15 days.

(21) Appl. No.: 18/866,519

(22) PCT Filed: Mar. 16, 2023

(86) PCT No.: PCT/CN2023/081841

§ 371 (c)(1),
(2) Date: Nov. 15, 2024

(87) PCT Pub. No.: WO2023/226548

PCT Pub. Date: Nov. 30, 2023

(65) Prior Publication Data

US 2025/0330706 A1 Oct. 23, 2025

(30) Foreign Application Priority Data

May 25, 2022 (CN) ......................... 202210583586.3

(51) Int. Cl.
*H04N 23/67* (2023.01)
*H04N 17/00* (2006.01)
*H04N 23/667* (2023.01)

(52) U.S. Cl.
CPC ......... *H04N 23/672* (2023.01); *H04N 17/002* (2013.01); *H04N 23/667* (2023.01)

(58) Field of Classification Search
CPC ... H04N 17/002; H04N 23/667; H04N 23/672
See application file for complete search history.

(56) References Cited

U.S. PATENT DOCUMENTS 9,848,131 B2 * 12/2017 Shiohara .............. H04N 25/447
2012/0229628 A1 * 9/2012 Ishiyama ............. H04N 13/239
348/135

(Continued)

FOREIGN PATENT DOCUMENTS

CN 106060407 A 10/2016
CN 112135039 A 12/2020

(Continued)

OTHER PUBLICATIONS

International Search Report in International application No. PCT/CN2023/081841,mailed on Apr. 18, 2023.

(Continued)

*Primary Examiner* — Antoinette T Spinks
(74) *Attorney, Agent, or Firm* — PV IP PC; Wei Te Chung

(57) ABSTRACT

Disclosed in the present application are a lens focusing method and apparatus, and an electronic device and a computer-readable storage medium. The method comprises: acquiring a target phase difference of a preview image, which is collected by a main camera lens in a macro photographing mode; acquiring a calibration data set corresponding to the macro photographing mode; determining a target current on the basis of a calibration current corresponding to a calibration phase difference which matches the target phase difference; and driving, according to the target current, the main camera lens to perform focusing. By means of the present application, a macro photographing function can be achieved by means of a main camera lens.

18 Claims, 4 Drawing Sheets

(56) References Cited

U.S. PATENT DOCUMENTS

| | | | | |
|---|---|---|---|---|
| 2016/0044221 | A1* | 2/2016 | Shiohara | H04N 23/10<br>348/360 |
| 2016/0044230 | A1* | 2/2016 | Yoshimura | H04N 25/61<br>348/349 |
| 2017/0118395 | A1* | 4/2017 | Van Hoeckel | G03B 13/36 |
| 2018/0349378 | A1* | 12/2018 | Galor Gluskin | G03B 13/36 |
| 2021/0243422 | A1* | 8/2021 | Hayasaka | H04N 23/67 |
| 2022/0353411 | A1* | 11/2022 | Kim | H04N 23/611 |
| 2026/0012714 | A1* | 1/2026 | Katz | H04N 25/57 |

FOREIGN PATENT DOCUMENTS

| | | | | |
|---|---|---|---|---|
| CN | 112672045 A | 4/2021 | | |
| CN | 112866542 A | 5/2021 | | |
| CN | 112969023 A | 6/2021 | | |
| CN | 113014790 A | 6/2021 | | |
| CN | 113572956 A | * 10/2021 | | H04N 23/67 |

OTHER PUBLICATIONS

Written Opinion of the International Search Authority in International application No. PCT/CN2023/081841,mailed on Apr. 18, 2023.

* cited by examiner

PHASE-DIFFERENCE-BASED MACRO FOCUSING METHOD AND APPARATUS FOR CAMERA LENS

CROSS REFERENCE TO RELATED APPLICATIONS

The application is a US national phase application based upon an International Application No. PCT/CN2023/081841, filed on Mar. 16, 2023, titled "LENS FOCUSING METHOD AND APPARATUS, AND ELECTRONIC DEVICE AND COMPUTER-READABLE STORAGE MEDIUM", which claims priority to Chinese patent application No. 2022105835863, filed on May 25, 2022, titled "LENS FOCUSING METHOD AND APPARATUS, AND ELECTRONIC DEVICE AND COMPUTER-READABLE STORAGE MEDIUM", which is incorporated by reference in the present application in its entirety.

FIELD OF DISCLOSURE

The present disclosure relates to the field of photography technology, and more particularly, to a lens focusing method and apparatus, and electronic device and computer-readable storage medium.

DESCRIPTION OF RELATED ART

With the improvement of living standards, people's requirements for camera shooting functions are also increasing. For example, cameras have wide-angle shooting functions and macro shooting functions.

Currently, one shooting function is generally implemented through one camera, for example, the macro shooting function is implemented through a macro camera, leading to increased costs.

SUMMARY OF THE INVENTION

Technical Problem

The embodiments of this application can solve the technical problem of high costs caused by implementing macro shooting function through macro lenses.

Solutions to the Problems

The embodiments of this application provide a lens focusing method, including:

- obtaining a target phase difference of a preview image captured by the main camera lens under a macro shooting mode;
- obtaining calibration data set corresponding to the macro shooting mode, wherein the said calibration data set includes calibration phase differences and calibration currents for reference calibrated macro distances;
- determining a target current based on the calibration currents corresponding to the calibration phase differences that match the said target phase difference; and
- driving the said main camera lens to focus according to the said target current.

Correspondingly, the embodiments of this application provide a lens focusing apparatus, including:

- a first acquisition module used for obtaining a target phase difference of a preview image captured by a main camera lens under a macro shooting mode;

- a second acquisition module used for obtaining calibration data set corresponding to the said macro shooting mode, wherein the said calibration data set includes calibration phase differences and calibration currents for reference calibrated macro distances;
- a current determination module used for determining a target current based on calibration currents corresponding to the calibration phase differences that match the said target phase difference; and
- a lens focusing module used for driving the said main camera lens to focus according to the said target current.

Furthermore, the embodiments of this application also provide an electronic device, including a processor and memory, wherein the said memory stores computer programs, and the said processor is used for running the computer programs stored in the said memory to implement the lens focusing method provided by the embodiments of this application.

Additionally, the embodiments of this application also provide a computer-readable storage medium, wherein the said computer-readable storage medium stores computer programs, and the said computer programs are suitable for being loaded by a processor to execute any of the lens focusing methods provided by the embodiments of this application.

Additionally, the embodiments of this application also provide a computer program product, including computer programs, wherein the said computer programs, when executed by a processor, implement any of the lens focusing methods provided by the embodiments of this application.

Advantageous Effects

In the embodiments of this application, first the target phase difference of a preview image captured by the main camera lens under a macro shooting mode is obtained. Then the calibration data set corresponding to the macro shooting mode is obtained, wherein the calibration data set includes calibration phase differences and calibration currents for reference calibrated macro distances. Next, the target current is determined based on the calibration current corresponding to the calibration phase difference that matches the target phase difference. Finally, the main camera lens is driven to focus according to the target current.

That is, in the embodiments of this application, since the calibration data set includes calibration phase differences and calibration currents for reference calibrated macro distances, the target current determined based on the target phase difference, calibration phase differences and calibration currents can drive the main camera lens to focus within macro distances, thereby implementing macro shooting function through the main camera lens without requiring a macro camera, resulting in lower costs.

DESCRIPTION OF DRAWINGS

To more clearly explain the technical solutions in the embodiments of this application, a brief introduction will be given below to the drawings needed in the description of the embodiments. Obviously, the drawings described below are merely some embodiments of this application. For those skilled in the art, other drawings can be obtained based on these drawings without creative labor.

EMBODIMENTS OF THE INVENTION

The technical solutions in the embodiments of this application will be clearly and completely described below in conjunction with the drawings of the embodiments of this application. Obviously, the described embodiments are merely some embodiments of this application, rather than all of the embodiments. All other embodiments obtained by those skilled in the art without creative labor based on the embodiments of this application shall fall within the protection scope of this application.

The embodiments of this application provide a lens focusing method, apparatus, electronic device and computer-readable storage medium. The lens focusing apparatus can be integrated into the electronic device, wherein the electronic device can be a server or a terminal device.

The server can be an independent physical server, or a server cluster or distributed system composed of multiple physical servers, or a cloud server that provides basic cloud computing services such as cloud services, cloud databases, cloud computing, cloud functions, cloud storage, network services, cloud communications, middleware services, domain name services, security services, network acceleration services (Content Delivery Network, CDN), as well as big data and artificial intelligence platforms.

The terminal can be a smartphone, tablet computer, laptop computer, desktop computer, smart speaker, smart watch, etc., but is not limited thereto. The terminal and server can be directly or indirectly connected through wired or wireless communication methods, which is not limited in this application.

Additionally. "multiple" in the embodiments of this application refers to two or more. Terms such as "first" and "second" in the embodiments of this application are used for distinguishing description and should not be understood as implying relative importance.

Figure 1:
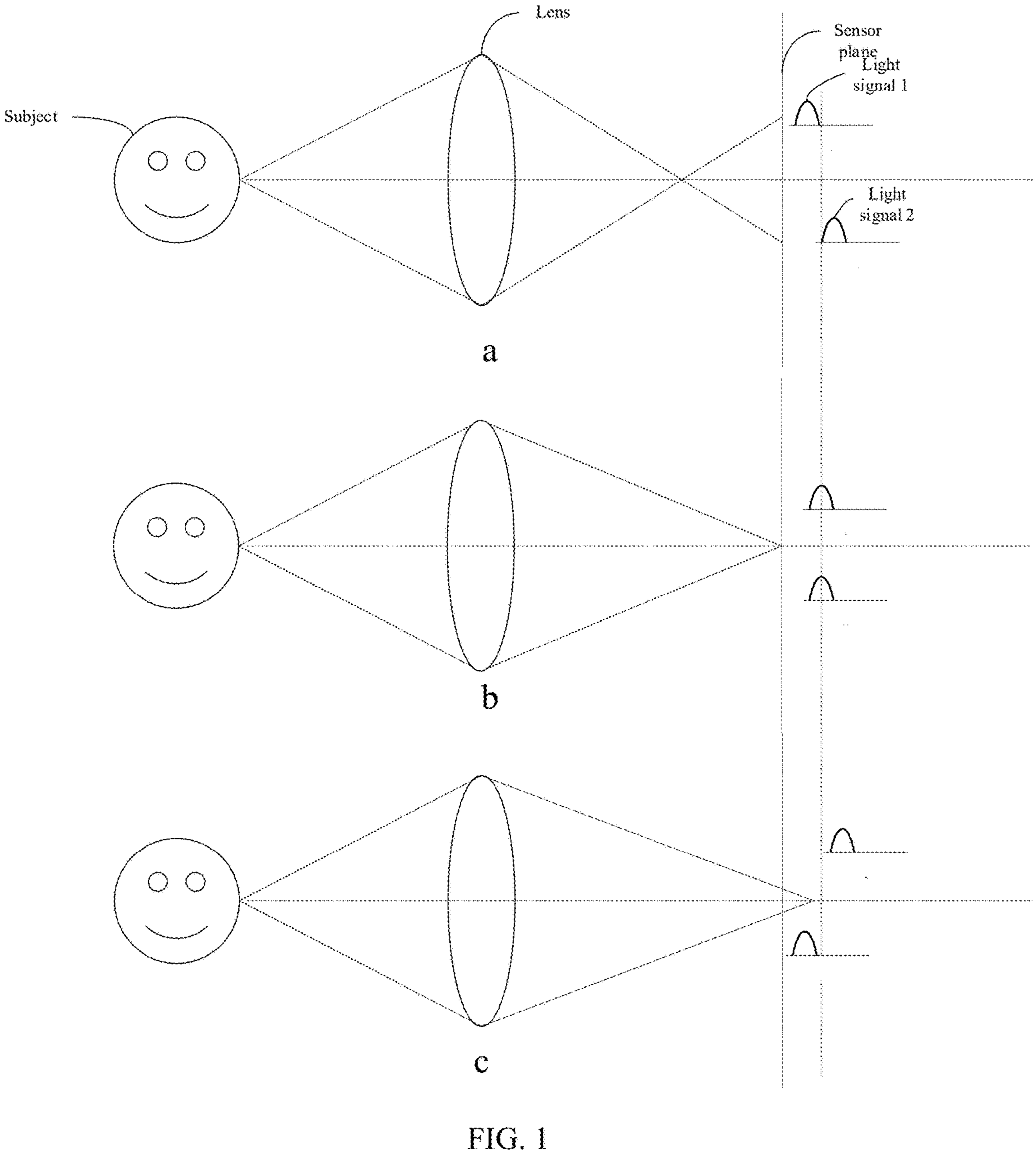
FIG. 1 is a schematic diagram illustrating phase focusing principles provided by the embodiments of this application.

Phase detection auto focus (PDAF) refers to calculating the lens offset based on phase difference, and then moving the lens to the focus position according to the offset. Taking FIG. 1 as an example, light rays from different directions cause the subject to be imaged onto the sensor through the lens. When light rays from different directions converge on the sensor, as shown in b of FIG. 1, there is no phase difference between light signal 1 and light signal 2 detected by the sensor. In this condition, a clear image of the subject can be captured. When light rays from different directions converge in front of the sensor, as shown in FIG. 1, there exists a phase difference between light signal 1 and light signal 2 detected by the sensor. In the condition, the captured image of the subject is blurry. When light rays from different directions converge behind the sensor, as shown in c of FIG. 1, there also exists a phase difference between light signal 1 and light signal 2 detected by the sensor. In the condition, the captured image of the subject is also blurry.

In execution of phase focusing, first, the phase difference of the subject's image is obtained when the lens is at the current position. Then the phase difference is converted into the distance that the lens needs to move. Finally, the motor is driven to move the lens by that distance, after which a clear image of the subject can be obtained through the lens.

The following will be explained in detail respectively. It should be noted that the description order of the following embodiments does not limit the preferred order of the embodiments.

In this embodiment, the description will be made from the perspective of the lens focusing apparatus. For convenience in explaining the lens focusing method of this application, the following detailed explanation will be based on the lens focusing apparatus being integrated in a terminal, that is, the detailed explanation will be made with the terminal as the executing subject.

Figure 2:
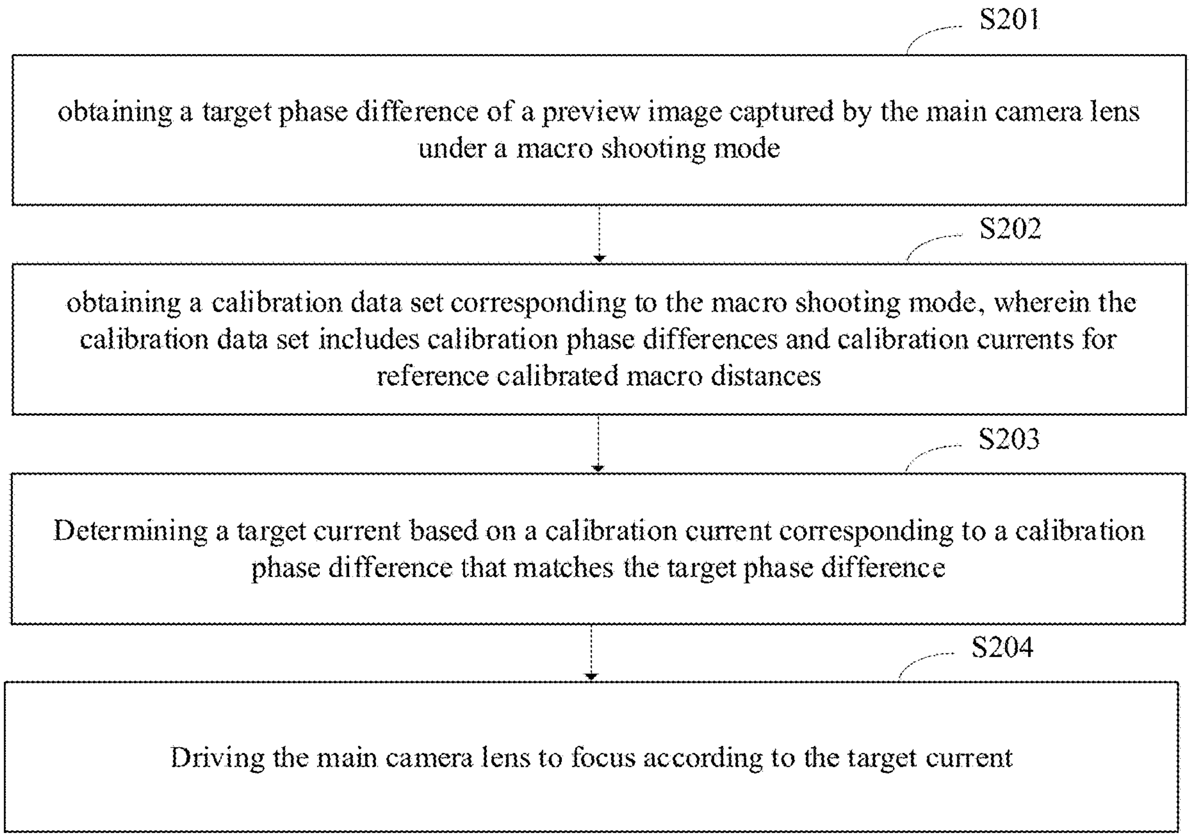
FIG. 2 is a flow diagram illustrating a lens focusing method provided by the embodiments of this application.

Please refer to FIG. 2, which is a flow diagram of a lens focusing method provided by an embodiment of this application. The lens focusing method can include:

- S201, obtaining a target phase difference of a preview image captured by the main camera lens under a macro shooting mode.

When the terminal detects entering a macro shooting mode, the terminal can directly capture a preview image at the current position of the main camera lens, or the terminal can first drive the motor to move the main camera lens to reach an initial position, then capture a preview image corresponding to the initial position through the main camera lens, and finally calculate the target phase difference of this preview image.

Optionally, multiple initial positions can be preset. Then, when the current position of the main camera lens is included in the multiple initial positions, the terminal can directly capture a preview image at the current position of the main camera lens. When the current position of the main camera lens is not included in the multiple initial positions, the terminal can first drive the motor to move the main camera lens to reach an initial position, then capture a preview image corresponding to the initial position through the main camera lens.

It should be understood that when the current position of the main camera lens is not included in the multiple initial positions, the main camera lens can be moved to the initial position nearest to the current position.

Alternatively, only one initial position can be set, then the motor is directly driven to move the main camera lens from the current position to the initial position, and then a preview image corresponding to the initial position is captured through the main camera lens.

Since one preview image has multiple phase differences, therefore, in some embodiments, obtaining the target phase difference of the preview image captured by the main camera lens under the macro shooting mode includes:

- Determining multiple initial phase differences of the preview image captured by the main camera lens under the macro shooting mode;
- Taking the maximum initial phase difference among the multiple initial phase differences as the target phase difference of the preview image.
- Alternatively, obtaining the target phase difference of the preview image captured by the main camera lens under a macro shooting mode includes:
- Determining multiple initial phase differences of the preview image captured by the main camera lens under the macro shooting mode;
- Taking an average value of the multiple initial phase differences as the target phase difference of the preview image.

Wherein, the average value of all initial phase differences of the preview image can be taken as the target phase difference of the preview image. Alternatively, the average value of a portion of the initial phase differences of the preview image can be taken as the target phase difference of the preview image. This embodiment does not make limitations herein.

When taking the average value of a portion of the initial phase differences of the preview image as the target phase difference of the preview image, taking the average value of multiple initial phase differences as the target phase difference of the preview image includes:

Arranging the multiple initial phase differences according to a preset rule to obtain a target array corresponding to the preview image;

Calculating the target phase difference of the preview image based on the average value of the initial phase differences at preset positions in the target array.

For example, the preset rule is a 6*8 two-dimensional array rule, that is, the target array is a 6*8 two-dimensional array, and the preset positions are the four central positions. Then arrange the initial phase differences into a 6*8 two-dimensional array, and take the average value of the four initial phase differences at the central positions of the 6*8 two-dimensional array as the target phase difference.

S202, obtaining a calibration data set corresponding to the macro shooting mode, wherein the calibration data set includes calibration phase differences and calibration currents for reference calibrated macro distances.

When there are multiple initial positions in the macro shooting mode, one initial position can correspond to one calibration data set. Therefore, after the terminal captures a preview image at the initial position, it can obtain the calibration data set corresponding to the initial position.

The reference calibrated macro distances are macro distances set during the calibration process of the main camera lens. For example, the reference calibrated macro distances can include 5 centimeters, 6.5 centimeters, and 8 centimeters, etc., that is, obtaining calibration images of the subject at positions of 5 centimeters, at positions of 6.5 centimeters, and at positions of 8 centimeters respectively.

The calibration phase difference refers to the phase difference of the calibration image obtained by the main camera lens at the initial position when the subject is located at the position of the reference calibration distance during the calibration process of the main camera lens. The calibration current refers to the current needed to move the main camera lens from the initial position to a position where a clear image of the subject can be obtained when the subject is located at the position of the reference calibrated macro distance, that is, the current needed to move the main camera lens from the initial position to the focus position corresponding to the reference calibrated macro distance.

It should be understood that the calibration current can also be DAC (Digital-to-Analog Converter) value or code value, wherein the code value refers to the indication code of the motor's travel, which can be understood as the computer language representation of the motor's travel. The motor's travel is also the distance that the main camera lens moves.

It should be noted that before the main camera lens leaves the factory, the calibration data set can be first burned into the memory used for storing lens data, wherein the memory for storing lens data can be, for example, Electrically Erasable Programmable read only memory (EEPROM), and then the terminal reads the calibration data set from the memory.

Therefore, in some embodiments, before obtaining the calibration data set corresponding to the macro shooting mode, the method further includes:

Obtaining multiple test macro distances under the macro shooting mode;

Selecting reference calibrated macro distances from the multiple test macro distances;

Moving the main camera lens to an initial position for capturing a preview image, and photographing a subject located at the position of the reference calibrated macro distance to obtain a calibration image of the subject;

Determining the calibration phase differences and calibration currents for the reference calibrated macro distances based on the calibration image;

Determining the calibration data set corresponding to the macro shooting mode based on the calibration phase differences and calibration currents for the reference calibrated macro distances.

The test macro distances can be selected according to actual situations. For example, when the macro distance is 5 centimeters to 8 centimeters, the range of 5 centimeters to 8 centimeters can be divided to obtain test macro distances of 5 centimeters, 5.5 centimeters, 6.5 centimeters, and 8 centimeters.

After obtaining multiple test macro distances, the largest test macro distance among the multiple test macro distances can be first taken as a reference calibrated macro distance, or the smallest test macro distance among the multiple test macro distances can be first taken as a reference calibrated macro distance, or a test macro distance can be randomly selected from the multiple test macro distances as a reference calibrated macro distance. This embodiment does not make limitations herein.

Wherein, the process of determining the calibration phase differences and calibration currents for the reference calibrated macro distances based on the calibration image, and determining the calibration data set corresponding to the macro shooting mode based on the calibration phase differences and calibration currents for the reference calibrated macro distances can be:

Based on the calibration image, determining the calibration phase difference corresponding to the reference calibrated macro distance;

Moving the main camera lens according to a moving current until the main camera lens reaches the initial focus position corresponding to the reference calibrated macro distance;

Taking the moving current corresponding to the initial focus position as the calibration current corresponding to the reference calibrated macro distance;

If the multiple test macro distances have not been completely selected, returning to execute the step of selecting reference calibrated macro distances from the multiple test macro distances.

If the multiple test macro distances have been completely selected, then determining the calibration data set corresponding to the macro shooting mode based on the calibration phase differences and calibration currents for the reference calibrated macro distances.

After obtaining the calibration phase difference for the reference calibrated macro distance (the terminal can input the calibration image into the QUALCOMM™ tool for calculation to obtain the calibration phase difference for the reference calibrated macro distance), the terminal can first store the calibration phase difference for the reference calibrated macro distance, then continuously input different moving currents to the motor of the main camera lens for movement, thereby causing the main camera lens to continuously move.

It should be understood that after each input of moving current drives the motor to move the main camera lens to the position corresponding to that moving current, the terminal can obtain a preview image at the position corresponding to that moving current, then determine whether that position is the initial focus position corresponding to the reference calibrated macro distance based on the phase difference of the preview image at the position corresponding to that moving current. If not, continue inputting moving current to the motor; if it is the initial focus position corresponding to the reference calibrated macro distance, then take the moving current as the calibration current corresponding to the reference calibrated macro distance.

Since there are multiple test macro distances, that is, there are multiple reference calibrated macro distances, then after obtaining a reference calibrated macro distance, if there are still test macro distances that have not been taken as reference calibrated macro distances, that is, if the multiple test macro distances have not been completely selected, return to execute the step of selecting reference calibrated macro distances from the multiple test macro distances. If the multiple test macro distances have been completely selected, then determine the calibration data set corresponding to the macro shooting mode based on the calibration phase differences and calibration currents for the reference calibrated macro distances.

For example, the test macro distances include 5 centimeters, 5.5 centimeters, 6.5 centimeters and 8 centimeters. First take 5 centimeters as a reference calibrated macro distance, then place the main camera lens at the initial position and obtain a calibration image of the subject at the position of 5 centimeters, then determine the calibration phase difference of the calibration image at 5 centimeters, then continuously input moving currents to drive the motor to move the main camera lens until a clear image of the subject can be obtained, that is, find the initial focus position corresponding to 5 centimeters (the focus position refers to the position of the lens when a clear image can be obtained), and take the moving current corresponding to obtaining a clear image of the subject as the calibration current corresponding to 5 centimeters.

At this time, since there are still 5.5 centimeters, 6.5 centimeters and 8 centimeters among the test macro distances, therefore, return to execute the step of selecting reference calibrated macro distances from the multiple test macro distances, until obtaining the calibration phase difference and calibration current corresponding to 5.5 centimeters, the calibration phase difference and calibration current corresponding to 6.5 centimeters, and the calibration phase difference and calibration current corresponding to 8 centimeters. Finally, the calibration phase difference and calibration current corresponding to 5 centimeters, the calibration phase difference and calibration current corresponding to 5.5 centimeters, the calibration phase difference and calibration current corresponding to 6.5 centimeters, and the calibration phase difference and calibration current corresponding to 8 centimeters form the calibration data set.

It should be noted that when the main camera lens is at different initial positions, the calibration phase differences of the calibration images of the subject at the positions of reference calibrated macro distances are different, and the moving currents for moving the main camera lens from the initial position to the initial focus position corresponding to the reference calibrated macro distance are also different. Therefore, if multiple initial positions are preset, after obtaining the calibration data set corresponding to one initial position, the calibration data sets corresponding to other initial positions can be obtained, wherein the test macro distances corresponding to different initial positions can be the same or different.

Optionally, the initial position can be set according to multiple test macro distances. For example, the focus position corresponding to the maximum test macro distance among the multiple test macro distances can be taken as the initial position, or the focus position corresponding to the minimum test macro distance among the multiple test macro distances can be taken as the initial position.

Alternatively, the middle position between the focus position corresponding to the maximum test macro distance among the multiple test macro distances and the focus position corresponding to the minimum test macro distance can be taken as the initial position. At this time, before moving the main camera lens to the initial position for capturing a preview image, the method further includes:

Screening out a maximum test macro distance and a minimum test macro distance from multiple test macro distances; and Determining the initial position based on a focus position corresponding to the maximum test macro distance and a focus position corresponding to the minimum test macro distance.

The average value of the calibration currents for the maximum and minimum test macro distances can be used as the driving current for the initial position. When this driving current is input to the motor, it can drive the motor to move the main camera lens to the initial position.

For example, when the calibration current and driving current are represented by code values, if the maximum test macro distance is 8 cm with a corresponding code value of 500, and the minimum test macro distance is 5 cm with a code value of 800, then the code value for the initial position would be 650.

Optionally, the terminal can execute the step of determining the calibration data set for macro shooting mode based on the calibration phase difference and calibration current of the reference calibrated macro distance once before each main camera lens leaves the factory. Alternatively, this step can be executed only once for the same device type of main camera lens. In this case, before obtaining the target phase difference of the preview image captured by the main camera lens in the macro shooting mode, the method also includes:

Determining a device type of the main camera lens; and

Determining the calibration data set for macro shooting mode according to the device type.

After obtaining the device type of the main camera lens, the terminal searches for the corresponding calibration data set. If a calibration data set exists for this device type, it will be used as the calibration data set for macro shooting mode and stored in the electrically erasable programmable read-only memory (EEPROM). If no calibration data exists for this device type, the terminal will execute the step of determining the calibration data set for macro shooting mode based on the calibration phase difference and calibration current of the reference calibrated macro distance, and associate this calibration data set with the device type of the main camera lens for storage.

S203: Determining a target current based on a calibration current corresponding to a calibration phase difference that matches the target phase difference.

A matching calibration phase difference refers to a calibration phase difference whose difference from the target phase difference falls within a preset range. Determining the target current based on the calibration current can mean either using the calibration current directly as the target current, or multiplying the calibration current by a preset current weight to obtain a first multiplication result, which is then used as the target current.

In related technology, the relationship between the main camera lens movement distance and phase difference can be either linear or non-linear. In other words, the relationship between the motor travel (which equals the main camera lens movement distance) and phase difference, as well as the relationship between phase difference and motor driving current, can be either linear or non-linear. For example, when the motor travel is 0-400 micrometers, the relationship can be linear, while from 401-600 micrometers, it can be non-linear.

When the relationship between motor travel and phase difference is linear, after obtaining the phase difference, the terminal can multiply it by a fixed slope to obtain the motor travel, thus driving the motor to move the main camera lens to the focus position.

However, when the subject is at a macro distance, multiplying the phase difference by a fixed slope results in incorrect motor travel. This means driving the motor to move the main camera lens in this way cannot move the lens to the correct focus position.

In this case, to move the main camera lens to the focus position using a linear relationship, the motor travel corresponding to the linear relationship needs to be increased. The increased motor travel leads to a larger volume of the optical module containing the main camera lens, resulting in higher costs.

When the relationship between the motor travel and the phase difference is non-linear, due to the varying slope, it is impossible to convert the phase difference into motor travel based on the slope. Therefore, currently, when using the fixed slope method, the main camera lens cannot be moved to the focus position when the subject is at the macro position. When using the variable slope method, the motor travel cannot be determined from the phase difference.

However, in this embodiment, because the calibration data set includes the calibration phase differences and the calibration currents for the reference calibrated macro distances, and the target current is determined based on the calibration current corresponding to the calibration phase difference that matches the target phase difference, even if the relationship between the calibration phase difference and the calibration current is non-linear (even if the relationship between the motor travel and the calibration phase difference is non-linear), the target current can still be obtained from the target phase difference. This enables driving the motor to move the main camera lens using the target current, thereby utilizing the non-linear relationship between the motor travel and the phase difference to achieve macro photography functionality through the main camera lens, without requiring an additional macro lens or increasing the volume of the optical module, significantly reducing costs.

In some embodiments, there are multiple reference calibrated macro distances, with each reference calibrated macro distance corresponding to multiple calibration phase differences and one calibration current;

Before determining the target current based on the calibration current corresponding to the calibration phase difference that matches the target phase difference, the method also includes:

Performing arithmetic operations on the multiple calibration phase differences corresponding to the reference calibrated macro distances to obtain a target phase value; and Screening out the calibration phase difference that matches the target phase difference from the calibration data set based on the target phase value.

The arithmetic operations include at least one of addition, subtraction, multiplication, and division operations. When the arithmetic operations simultaneously include addition and division operations, the target phase value can be the target phase average value, meaning screening out the calibration phase difference that matches the target phase difference from the calibration data set based on the average of the multiple calibration phase differences. When the arithmetic operations simultaneously include addition, subtraction, multiplication, and division operations, the target phase value can be either the target phase variance or the target phase standard deviation, in which case the target phase difference can also be the variance or standard deviation of the initial phase difference.

When the target phase value is the target phase average value, the target phase average value can be either the average of all calibration phase differences for the reference calibrated macro distance, or the average of a portion of the calibration phase differences.

When the target phase average value is the average of a portion of the calibration phase differences for the reference calibrated macro distance, performing arithmetic operations on the multiple calibration phase differences includes:

Arranging the multiple calibration phase differences corresponding to each reference calibrated macro distance according to the preset rules to obtain arrangement arrays corresponding to each reference calibrated macro distance; and Calculating the target phase average value of the multiple calibration phase differences corresponding to the reference calibrated macro distance based on the average value of the calibration phase differences at the preset positions in the arrangement arrays.

The preset rules can be set according to actual conditions. For example, the preset rules can be a 6*8 two-dimensional array rule, or a one-dimensional array rule. This embodiment does not impose limitations on this.

Optionally, when arranging the calibration phase differences according to the preset rules, the positions of individual calibration phase differences in the arrangement arrays can be arranged according to ascending order rules, or descending order rules, or according to the positions of preview image information corresponding to light signals associated with the calibration phase differences in the preview image.

For example, when the preset rule is a 6*8 two-dimensional array rule, during the process of arranging the multiple calibration phase differences into a 6*8 two-dimensional array, the multiple calibration phase differences can be arranged according to ascending order rules to obtain the 6*8 two-dimensional array.

The preset positions can be selected according to actual conditions. For example, in this embodiment, the central four positions of the arrangement array can be used as the preset positions, or the first two positions and last two positions of the arrangement array can be used as the preset positions. This embodiment does not impose limitations on this.

Since the calibration phase differences corresponding to the central four positions of the arrangement array can accurately determine the required movement distance of the main camera lens, the average value of the calibration phase differences at the central four positions of the arrangement array can be used as the target phase average value of the multiple calibration phase differences corresponding to the reference calibrated macro distance. This eliminates the need to calculate the average value of all calibration phase differences for the reference calibrated macro distance, thereby enabling accurate determination of the matching target phase value and subsequently the calibration phase difference that matches the target phase difference while reducing computational load.

Since there are multiple reference calibrated macro distances, and each reference calibrated macro distance has a corresponding target phase value, there exist multiple target phase values. Therefore, the terminal can first match each target phase value with the target phase difference, then use the calibration phase difference corresponding to the target phase value that matches the target phase difference as the matching calibration phase difference value.

Alternatively, after obtaining the target phase value, the terminal can multiply the target phase value with a preset phase weight to obtain a second multiplication result, then screen out the calibration phase difference that matches the target phase difference from the calibration data set based on the second multiplication result, meaning matching the second multiplication result with the target phase difference.

When matching the target phase value with the target phase difference, screening out the calibration phase difference that matches the target phase difference from the calibration data set based on the target phase value includes:

Matching the target phase difference with the target phase value corresponding to each reference calibrated macro distance to obtain the target phase value that matches the target phase difference; and Screening out the calibration phase difference that matches the target phase difference from the calibration data set based on the target phase value that matches the target phase difference.

In other words, using the multiple calibration phase differences corresponding to the target phase value that matches the target phase difference as the calibration phase difference that matches the target phase differences, then using the calibration current corresponding to these multiple calibration phase differences in the calibration data set as the target current.

Matching the target phase difference with the target phase value corresponding to each reference calibrated macro distance can involve separately calculating the differences between the target phase difference and each target phase value, then using the target phase value with the smallest difference as the target phase value that matches the target phase difference. Alternatively, it can involve first arranging the target phase values sequentially according to numerical value to obtain a matching array, then comparing sequentially with the target phase difference to determine the numerical interval position of the target phase difference in the matching array, thereby finding the target phase value that matches the target phase difference and reducing the number of comparisons.

When the target phase value is the target phase average value and the target phase values are arranged sequentially by numerical value to obtain a matching array, matching the target phase difference with the target phase value corresponding to each reference calibrated macro distance to obtain the target phase value that matches the target phase difference includes:

Obtaining the matching array by arranging the target phase average values corresponding to each reference calibrated macro distance sequentially according to numerical value;

Determining a numerical interval position of the target phase difference in the matching array; and Determining the target phase average value that matches the target phase difference based on the numerical interval position.

The numerical value arrangement includes either descending or ascending order. The numerical interval position refers to the position between two adjacent average values in the matching array. After obtaining the numerical interval position, the terminal can determine the two target phase values closest to the target phase difference from the multiple target phase values, then screen out the target phase average value that matches the target phase difference from these two closest target phase values.

For example, if the target phase average values are A, B, C, and D, where A is less than B, B is less than C, and C is less than D, the matching array is {A, B, C, D}. By comparing the target phase difference with the average values in the matching array sequentially, the numerical interval position of the target phase difference is determined to be between B and C, thus the two target phase differences closest to the target phase difference are B and C. Then the target phase average value that matches the target phase difference is screened out from B and C.

It should be understood that the terminal can either arrange the values sequentially to obtain the matching array immediately after obtaining the target phase average values, or arrange the target phase average values after obtaining the target phase difference. This embodiment does not impose limitations on this.

In this embodiment, obtaining the matching array by arranging the target phase average values corresponding to each reference calibrated macro distance sequentially, then determining a numerical interval position of the target phase difference in the matching array, and finally determining the target phase average value that matches the target phase difference based on the numerical interval position eliminates the need to compare the target phase difference with average values after the interval position in the array, thereby reducing computational load and obtaining the target phase average value that matches the target phase difference more quickly.

In other embodiments, determining a numerical interval position of the target phase difference in the matching array and determining the target phase average value that matches the target phase difference based on the numerical interval position includes:

Comparing the target phase difference with the average values in the matching array sequentially;

If the target phase difference is greater than the first average value and less than the second average value, determining the first difference value between the target phase difference and the first average value, and determining the second difference value between the target phase difference and the second average value, wherein the first average value and the second average value are two adjacent average values at the numerical interval position in the matching array;

If the absolute value of the first difference value is greater than the absolute value of the second difference value, using the second average value as the target phase average value that matches the target phase difference;

If the absolute value of the first difference value is less than the absolute value of the second difference value, using the first average value as the target phase average value that matches the target phase difference.

The terminal can start comparing the target phase difference with the average values in the matching array from either the first average value or the last average value in the matching array.

For example, if the target phase average values are A, B, C, and D, where A is less than B, B is less than C, and C is less than D, the matching array is {A, B, C, D}. The terminal first compares the target phase difference with the first average value A in the matching array. If the target phase difference is greater than A, it is compared with B. If the target phase difference is still greater than B, it is compared with C. If the target phase difference is less than C, then the numerical interval position of the target phase difference in the matching array is between B and C, meaning B is the first average value and C is the second average value. If the absolute value of the first difference value between the target phase difference and B is greater than the absolute value of the second difference value between the target phase difference and C, then C is used as the target phase average value that matches the target phase difference. At this point, there is no need to compare the target phase difference with average value D after the numerical interval position, thereby reducing computational load.

Alternatively, the terminal first compares the target phase difference with the last average value D. If the target phase difference is less than D, it is compared with C. If the target phase difference is still less than C, it is compared with B. If the target phase difference is greater than B, then the numerical interval position of the target phase difference in the matching array is between B and C, meaning B is the first average value and C is the second average value. If the absolute value of the first difference value between the target phase difference and B is greater than the absolute value of the second difference value between the target phase difference and C, then C is used as the target phase average value that matches the target phase difference. At this point, there is no need to compare the target phase difference with average value A after the numerical interval position, thereby reducing computational load.

Optionally, the terminal can first directly calculate a difference value between the target phase difference and the first average value in the matching array and a difference value between the target phase difference and the last average value in the matching array. If the difference value between the target phase difference and the first average value is less than the difference value between the target phase difference and the last average value, the terminal can start comparing sequentially from the first average value to compare the target phase difference with the respective average values in the matching array. If the difference value between the target phase difference and the first average value is greater than the difference value between the target phase difference and the last average value, the terminal can start comparing from the last average value to compare the target phase difference with the respective average values in the matching array, thereby enabling faster identification of the target phase average value that matches the target phase difference.

In other embodiments, screening out the calibration phase difference that matches the target phase difference from the calibration data set based on the target phase value includes:

Determining a confidence level of the target phase difference;

If the confidence level is equal to or greater than the preset threshold, screening out the calibration phase difference that matches the target phase difference from the calibration data set based on the target phase value.

The confidence level of the target phase difference is used to measure the reliability of the target phase difference, with higher confidence levels indicating higher reliability. The terminal can substitute the target phase difference into a preset function (such as a Gaussian function) to obtain the confidence level of the target phase difference. Alternatively, the terminal can look up the corresponding confidence level of the target phase difference from a preset mapping table.

The preset threshold can be selected according to actual conditions. For example, in this embodiment, the preset threshold is set to 60, though this embodiment does not impose limitations on this.

If the confidence level of the target phase difference is equal to or greater than the preset threshold, meaning the target phase difference is reliable, then the calibration phase difference that matches the target phase difference is screened out from the calibration data set based on the target phase value. If the confidence level is less than the preset threshold, meaning the target phase difference is unreliable, then this target phase difference is discarded and a new target phase difference is obtained.

Therefore, in other embodiments, after determining a confidence level of the target phase difference, the method also includes:

If the confidence level is less than the preset threshold, updating an acquisition count of the target phase difference;

If the acquisition count is less than or equal to the preset count, returning to execute the step of obtaining the target phase difference of the preview image captured by the main camera lens in the macro shooting mode;

If the acquisition count exceeds the preset count, using the preset focusing strategy to move the main camera lens to the target focus position.

When the confidence level of the target phase difference is less than the preset threshold, although a new target phase difference can be obtained, if the confidence level consistently remains below the preset threshold, focusing using the target phase difference may be problematic. In this case, focusing can be performed using the preset focusing strategy.

Therefore, in this embodiment, the number of times for obtaining a new target phase difference is limited, thus preventing infinite attempts to obtain new target phase differences and avoiding continuous phase focusing. Specifically, when the confidence level is less than the preset threshold and the acquisition count is less than or equal to the preset count, the step of obtaining the target phase difference of the preview image captured by the main camera lens in the macro shooting mode is executed again. If the confidence level is less than the preset threshold and the acquisition count exceeds the preset count, this indicates potential problems with focusing using the target phase difference, and in this case, focusing can be performed directly using the preset focusing strategy.

The preset focusing strategy can be selected according to actual conditions. For example, the preset focusing strategy in this embodiment can be Contrast Detection Auto Focus (CDAF) or Laser Detection Auto Focus (LDAF), though this embodiment does not impose limitations on this.

Updating the acquisition count of the target phase difference can mean incrementing the count by 1 or by 10; this embodiment does not impose limitations on this.

S204: Driving the main camera lens to focus according to the target current.

After obtaining the target current, if the current position of the subject matches the position of the reference calibrated macro distance, the terminal can directly drive the motor to move the main camera lens to the target focus position using the target current. If the current position of the subject differs from the position of the reference calibrated macro distance, the motor drives the main camera lens to a candidate position based on the target current. When there may still be some distance between the candidate position and the target focus position, the main camera lens can either be moved from the candidate position to the target focus position using the preset focusing strategy, or remain at the candidate position without further movement.

When there is a certain distance between the candidate position and the target focus position, driving the main camera lens to focus according to the target current includes:

Driving the main camera lens to the candidate position according to the target current;

Adjusting the main camera lens based on the candidate position until the main camera lens reaches the target focus position.

Specifically, adjusting the main camera lens based on the candidate position until it reaches the target focus position includes:

Obtaining the candidate phase difference of the preview image captured by the main camera lens at the candidate position;

If the candidate phase difference meets a preset phase threshold, determining that the candidate position is the target focus position and stopping the movement of the main camera lens;

If the candidate phase difference does not meet the preset phase threshold, determining that the candidate position is not the target focus position and using the preset focusing strategy to move the main camera lens to the target focus position.

When the preset focusing strategy is contrast detection auto focus, using the preset focusing strategy to move the main camera lens to the target focus position includes:

Obtaining the contrast difference value of the preview image captured by the main camera lens at the candidate position based on the preset focusing strategy;

Moving the main camera lens to the target focus position based on the contrast difference value.

In this embodiment, first moving the main camera lens to the candidate position based on the target phase difference, then using the preset focusing strategy to move it from the candidate position to the target focus position enables faster movement compared to directly using the preset focusing strategy.

As can be seen from the above, in this application embodiment, first the target phase difference of the preview image captured by the main camera lens in the macro shooting mode is obtained. Then the calibration data set corresponding to the macro shooting mode is obtained, which includes calibration phase differences and calibration currents for reference calibrated macro distances. Next, the target current is determined based on the calibration current corresponding to the calibration phase difference that matches the target phase difference. Finally, the main camera lens is driven to focus according to the target current.

Specifically, in this application embodiment, because the calibration data set includes calibration phase differences and calibration currents for reference calibrated macro distances, the main camera lens can be driven to focus at macro distances using the target current determined from the target phase difference, calibration phase difference, and calibration current. This enables macro photography functionality through the main camera lens without requiring a dedicated macro camera, resulting in lower costs.

Based on the method described in the above embodiments, the following examples provide further detailed explanation.

Figure 3:
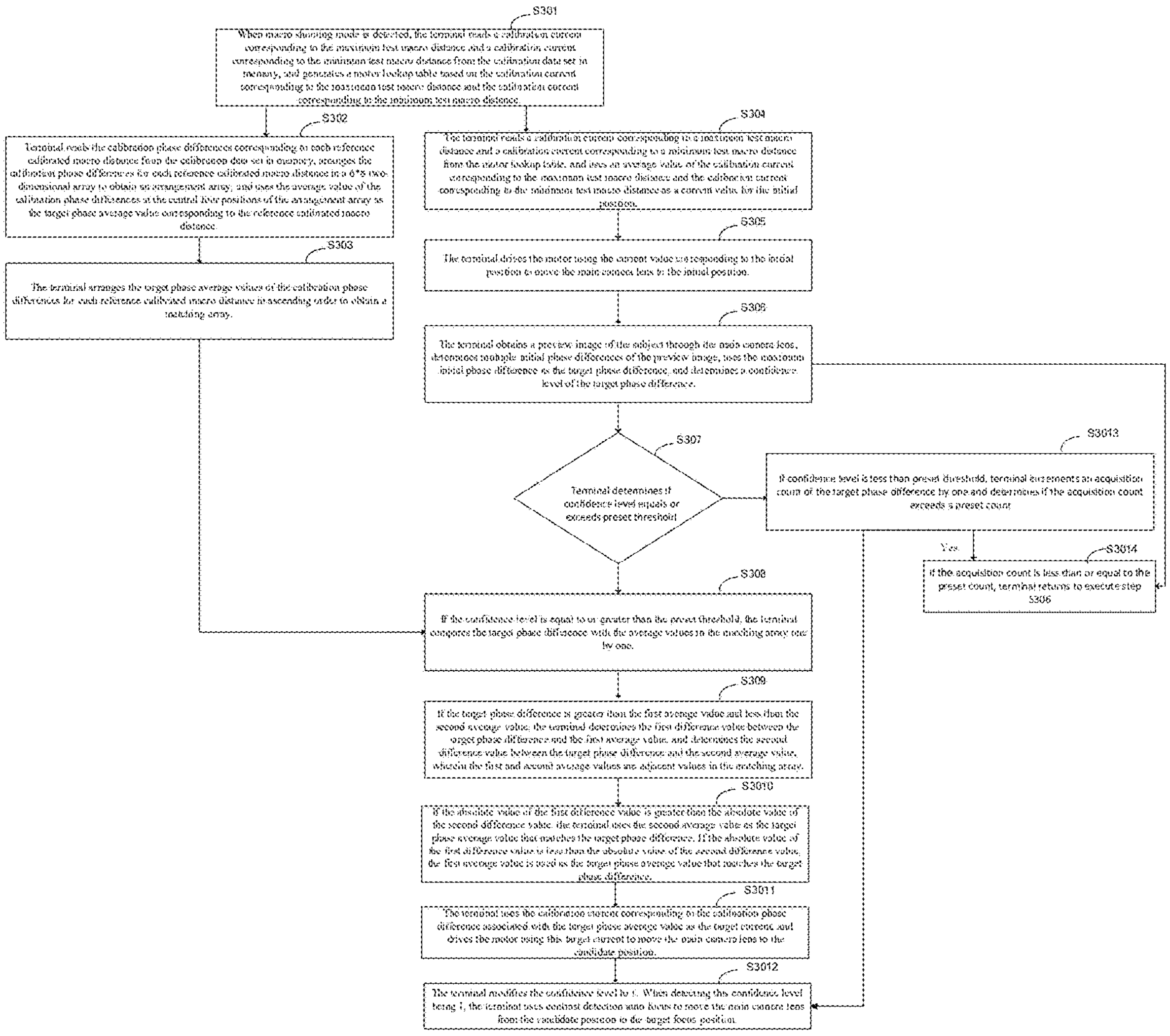
FIG. 3 is a flow diagram illustrating another lens focusing method provided by the embodiments of this application.

Please refer to FIG. 3, which shows a flow diagram of the lens focusing method provided in this application embodiment. The lens focusing method flow can include:

S301: When macro shooting mode is detected, the terminal reads a calibration current corresponding to the maximum test macro distance and a calibration current corresponding to the minimum test macro distance from the calibration data set in memory, and generates a motor lookup table based on the calibration current corresponding to the maximum test macro distance and the calibration current corresponding to the minimum test macro distance.

The maximum test macro distance can be used as a telephoto end and the minimum test macro distance as a close-focus end.

S302: The terminal reads the calibration phase differences corresponding to each reference calibrated macro distance from the calibration data set in memory, arranges the calibration phase differences for each reference calibrated macro distance in a 6*8 two-dimensional array to obtain an arrangement array, and uses the average value of the calibration phase differences at the central four positions of the arrangement array as the target phase average value corresponding to the reference calibrated macro distance.

S303: The terminal arranges the target phase average values of the calibration phase differences for each reference calibrated macro distance in ascending order to obtain a matching array.

S304: The terminal reads a calibration current corresponding to a maximum test macro distance and a calibration current corresponding to a minimum test macro distance from the motor lookup table, and uses an average value of the calibration current corresponding to the maximum test macro distance and the calibration current corresponding to the minimum test macro distance as a current value for the initial position.

S305: The terminal drives the motor using the current value corresponding to the initial position to move the main camera lens to the initial position.

S306: The terminal obtains a preview image of the subject through the main camera lens, determines multiple initial phase differences of the preview image, uses the maximum initial phase difference as the target phase difference, and determines a confidence level of the target phase difference.

S307: The terminal determines whether the confidence level is equal to or greater than the preset threshold.

S308: If the confidence level is equal to or greater than the preset threshold, the terminal compares the target phase difference with the average values in the matching array one by one.

S309: If the target phase difference is greater than the first average value and less than the second average value, the terminal determines the first difference value between the target phase difference and the first average value, and determines the second difference value between the target phase difference and the second average value, wherein the first and second average values are adjacent values in the matching array.

S3010: If the absolute value of the first difference value is greater than the absolute value of the second difference value, the terminal uses the second average value as the target phase average value that matches the target phase difference. If the absolute value of the first difference value is less than the absolute value of the second difference value, the first average value is used as the target phase average value that matches the target phase difference.

S3011: The terminal uses the calibration current corresponding to the calibration phase difference associated with the target phase average value as the target current, and drives the motor using this target current to move the main camera lens to the candidate position.

S3012: The terminal modifies the confidence level to 1. When detecting this confidence level being 1, the terminal uses contrast detection auto focus to move the main camera lens from the candidate position to the target focus position.

S3013: If the confidence level is less than the preset threshold, the terminal increments the acquisition count of the target phase difference by 1 and determines whether the acquisition count exceeds the preset count.

S3014: If the acquisition count is less than or equal to the preset count, the terminal returns to execute step S306.

If the acquisition count equals or exceeds the preset count, the terminal uses contrast detection auto focus to move the main camera lens from the initial position to the target focus position.

The specific implementation process and corresponding beneficial effects in this embodiment can refer to the above lens focusing method embodiment. This embodiment does not impose limitations on these.

To better implement the lens focusing method provided in this application embodiment, this application embodiment also provides an apparatus based on the above lens focusing method. The terms have the same meanings as in the above lens focusing method, and specific implementation details can refer to the explanation in the method embodiment.

Figure 4:
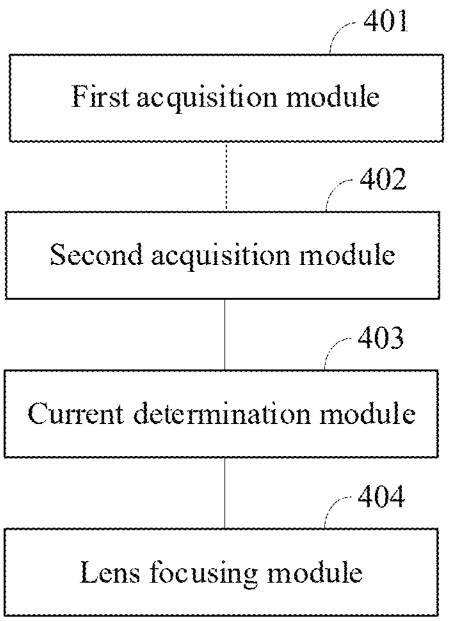
FIG. 4 is a structural diagram illustrating a lens focusing apparatus provided by the embodiments of this application.

For Example, as Shown in FIG. 4, the Lens Focusing Apparatus can Include:

- a first acquisition module 401, used to obtain a target phase difference of a preview image captured by a main camera lens in a macro shooting mode;
- a second acquisition module 402, used to obtain a calibration data set corresponding to the macro shooting mode, wherein the calibration data set includes calibration phase differences and calibration currents for reference calibrated macro distances;
- a current determination module 403, used to determine a target current based on a calibration current corresponding to a calibration phase difference that matches the target phase difference; and
- a lens focusing module 404, used to drive the main camera lens to focus according to the target current.

Optionally, the Lens Focusing Module 404 is Specifically Used to Execute:

- Driving the main camera lens to the candidate position according to the target current; and
- Adjusting the main camera lens based on the candidate position until it reaches the target focus position.

Optionally, the lens focusing module 404 is specifically used to execute:

- Obtaining the candidate phase difference of the preview image captured by the main camera lens at the candidate position;
- If the candidate phase difference meets the preset phase threshold, determining that the candidate position is the target focus position and stopping the movement of the main camera lens;
- If the candidate phase difference does not meet the preset phase threshold, determining that the candidate position is not the target focus position and using the preset focusing strategy to move the main camera lens to the target focus position.

Optionally, the Lens Focusing Module 404 is Specifically Used to Execute:

- Obtaining the contrast difference value of the preview image captured by the main camera lens at the candidate position based on the preset focusing strategy; and
- Moving the main camera lens to the target focus position based on the contrast difference value.

Optionally, there are multiple reference calibrated macro distances, with each corresponding to multiple calibration phase differences and one calibration current.

Correspondingly, the Lens Focusing Apparatus Also Includes:

- a matching module, used to execute:
- Performing arithmetic operations on the multiple calibration phase differences corresponding to the reference calibrated macro distances to obtain a target phase value; and
- Screening out the calibration phase difference that matches the target phase difference from the calibration data set based on the target phase value.

Optionally, the Matching Module is Specifically Used to Execute:

- Matching the target phase difference with the target phase value corresponding to each reference calibrated macro distance to obtain the target phase value that matches the target phase difference; and
- Screening out the calibration phase difference that matches the target phase difference from the calibration data set based on the target phase value that matches the target phase difference.

Optionally, the target phase value is the target phase average value.

Correspondingly, the Matching Module is Specifically Used to Execute:

- Obtaining the matching array by arranging the target phase average values corresponding to each reference calibrated macro distance sequentially according to numerical value;
- Determining a numerical interval position of the target phase difference in the matching array; and
- Determining the target phase average value that matches the target phase difference based on the numerical interval position.

Optionally, the Matching Module is Specifically Used to Execute:

- Comparing the target phase difference with the average values in the matching array sequentially;
- If the target phase difference is greater than the first average value and less than the second average value, determining the first difference value between the target phase difference and the first average value, and determining the second difference value between the target phase difference and the second average value, wherein the first and second average values are adjacent values at the numerical interval position in the matching array;

If the absolute value of the first difference value is greater than the absolute value of the second difference value, using the second average value as the target phase average value that matches the target phase difference;

If the absolute value of the first difference value is less than the absolute value of the second difference value, using the first average value as the target phase average value that matches the target phase difference.

Optionally, the target phase value is the target phase average value.

Correspondingly, the Matching Module is Specifically Configured to Execute:

Arranging multiple calibration phase differences corresponding to each reference calibrated macro distance according to preset rules to obtain an arrangement array corresponding to each reference calibrated macro distance; and Calculating the target phase average value of multiple calibration phase differences corresponding to the reference calibrated macro distances based on the average value of calibration phase differences at preset positions in the arrangement array.

Optionally, the Matching Module is Specifically Configured to Execute:

Determining a confidence level of the target phase difference;

If the confidence level is equal to or greater than the preset threshold, selecting the calibration phase difference that matches the target phase difference from the calibration data set based on the target phase value.

Optionally, the Matching Module is Also Configured to Execute:

If the confidence level is less than the preset threshold, updating an acquisition count of the target phase difference;

If the acquisition count is less than or equal to the preset count, returning to execute the step of obtaining the target phase difference of the preview image captured by the main camera lens in the macro shooting mode;

If the acquisition count exceeds the preset count, using the preset focusing strategy to move the main camera lens to the target focus position.

Optionally, the First Acquisition Module 401 is Specifically Configured to Execute:

Determining multiple initial phase differences of the preview image captured by the main camera lens in the macro shooting mode;

Using a maximum initial phase difference among the multiple initial phase differences as the target phase difference of the preview image.

Optionally, the First Acquisition Module 401 is Specifically Configured to Execute:

Determining multiple initial phase differences of the preview image captured by the main camera lens in the macro shooting mode; and Using the average value of the multiple initial phase differences as the target phase difference of the preview image.

Optionally, the Lens Focusing Apparatus Also Includes:

A set determination module configured to execute:

Obtaining multiple test macro distances in the macro shooting mode;

Selecting reference calibrated macro distances from the multiple test macro distances;

Moving the main camera lens to an initial position for capturing the preview image, and photographing a subject located at the position of the reference calibrated macro distance to obtain a calibration image of the subject;

Determining the calibration phase differences and the calibration currents of the reference calibrated macro distance based on the calibration image;

Determining the calibration data set corresponding to the macro shooting mode based on the calibration phase differences and the calibration currents of the reference calibrated macro distance.

Optionally, the Set Determination Module is Specifically Configured to Execute:

Determining the calibration phase differences corresponding to the reference calibrated macro distance based on the calibration image;

Moving the main camera lens according to a moving current until the main camera lens reaches an initial focus position corresponding to the reference calibrated macro distance;

Using the moving current corresponding to the initial focus position as the calibration current corresponding to the reference calibrated macro distance;

If the multiple test macro distances have not been completely selected, returning to execute the step of selecting reference calibrated macro distances from the multiple test macro distances; and If the multiple test macro distances have been completely selected, determining the calibration data set corresponding to the macro shooting mode based on the calibration phase differences and the calibration currents of the reference calibrated macro distance.

Optionally, the Set Determination Module is Specifically Configured to Execute:

Selecting a maximum test macro distance and a minimum test macro distance from the multiple test macro distances; and Determining the initial position based on a focus position corresponding to the maximum test macro distance and a focus position corresponding to the minimum test macro distance.

Optionally, the Set Determination Module is Specifically Configured to Execute:

Determining the device type of the main camera lens;

Determining the calibration data set corresponding to the macro shooting mode based on the device type.

In specific implementation, each of the above modules can be implemented as independent entities, or can be arbitrarily combined as one or several entities. The specific implementation methods and corresponding beneficial effects of each module can be referred to in the previous method embodiments and will not be repeated here.

Figure 5:
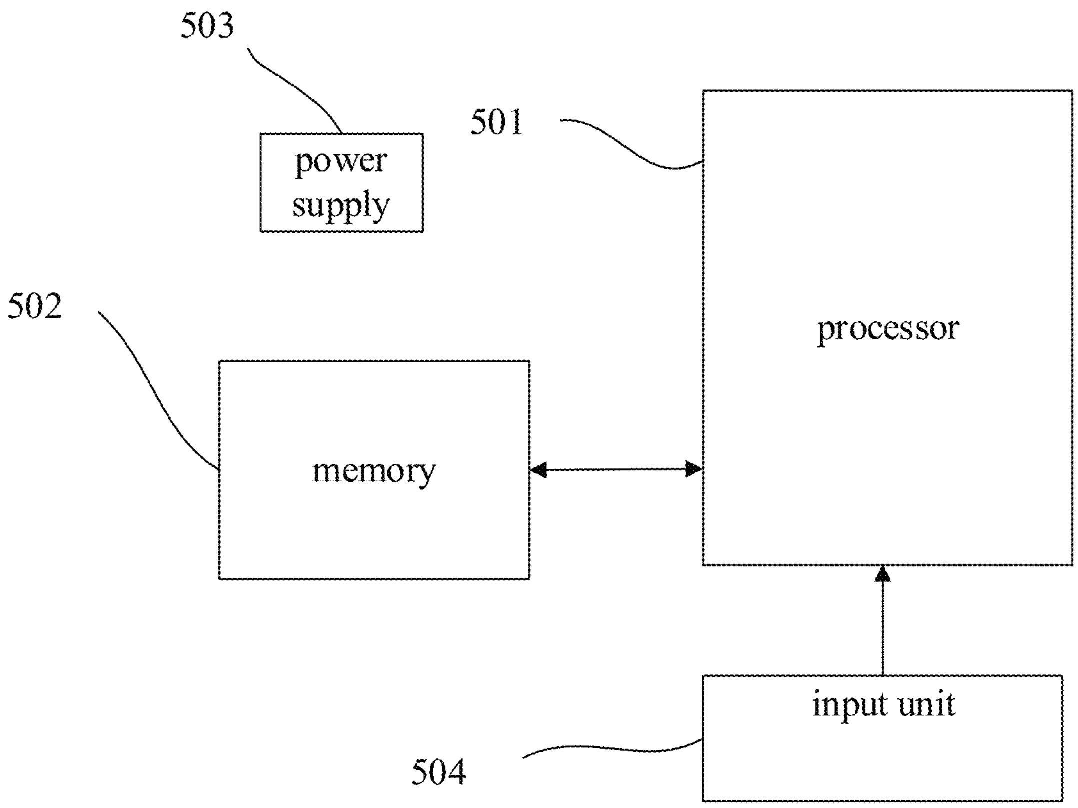
FIG. 5 is a structural diagram illustrating an electronic device provided by the embodiments of this application.

The embodiments of this application also provide an electronic device, which can be a server or terminal device, etc. As shown in FIG. 5, it illustrates the structural diagram of the electronic device involved in the embodiments of this application. Specifically:

The electronic device can include components such as a processor 501 with one or more processing cores, a memory 502 with one or more computer-readable storage media, a power supply 503, and an input unit 504. Those skilled in the art can understand that the electronic device structure shown in FIG. 5 does not constitute a limitation on the electronic device—it can include more or fewer components than illustrated, or combine certain components, or have different component arrangements. Among these:

The processor 501 is the control center of the electronic device, connecting all parts of the electronic device through various interfaces and circuits, executing various functions and processing data by running or executing computer programs and/or modules stored in memory 502, as well as calling data stored in memory 502. Optionally, processor 501 can include one or more processing cores; preferably, processor 501 can integrate an application processor and a modem processor, wherein the application processor mainly processes the operating system, user interface and applications, while the modem processor mainly processes wireless communications. It can be understood that the above-mentioned modem processor may also not be integrated into processor 501.

The memory 502 can be used to store computer programs and modules. Processor 501 executes various functional applications and data processing by running computer programs and modules stored in memory 502. Memory 502 can mainly include a program storage area and a data storage area, wherein the program storage area can store operating systems, computer programs required for at least one function (such as sound playback function, image playback function, etc.); the data storage area can store data created according to the use of the electronic device. Additionally, memory 502 can include high-speed random access memory, and can also include non-volatile memory, such as at least one magnetic disk storage device, flash memory device, or other volatile solid-state storage device. Correspondingly, memory 502 can also include a memory controller to provide processor 501 with access to memory 502.

The electronic device also includes a power supply 503 that provides power to various components. Preferably, power supply 503 can be logically connected to processor 501 through a power management system, thereby implementing functions such as charging management, discharging management, and power consumption management through the power management system. Power supply 503 can also include any components such as one or more direct current or alternating current power supplies, recharging systems, power failure detection circuits, power converters or inverters, power status indicators.

The electronic device can also include an input unit 504, which can be used to receive input digital or character information, and generate keyboard, mouse, joystick, optical or trackball signal inputs related to user settings and function control.

Although not shown, the electronic device can also include components such as a display unit, which will not be elaborated here. Specifically in this embodiment, the processor 501 in the electronic device will, according to the following instructions, load executable files corresponding to processes of one or more computer programs into memory 502, and processor 501 will run the computer programs stored in memory 502 to implement various functions, Obtaining the target phase difference of a preview image captured by a main camera lens in a macro shooting mode;

Obtaining the calibration data set corresponding to the macro shooting mode, wherein the calibration data set includes calibration phase differences and calibration currents for reference calibrated macro distances;

Determining a target current based on a calibration current corresponding to a calibration phase difference that matches the target phase difference; and Driving the main camera lens to focus according to the target current.

The specific implementation methods and corresponding beneficial effects of each of the above operations can be found in the detailed description of the lens focus method above, and will not be repeated here.

Those skilled in the art can understand that all or part of the steps in various methods of the above embodiments can be completed by computer programs, or by computer programs controlling related hardware. The computer programs can be stored in a computer-readable storage medium and loaded and executed by a processor.

Therefore, the embodiments of this application provide a computer-readable storage medium storing computer programs that can be loaded by a processor to execute steps in any of the lens focus methods provided by the embodiments of this application. For example, the computer programs can execute the following steps:

Obtaining the target phase difference of a preview image captured by a main camera lens in a macro shooting mode;

Obtaining the calibration data set corresponding to the macro shooting mode, wherein the calibration data set includes calibration phase differences and calibration currents for reference calibrated macro distances;

Determining a target current based on a calibration current corresponding to a calibration phase difference that matches the target phase difference;

Driving the main camera lens to focus according to the target current.

The specific implementation methods and corresponding beneficial effects of each of the above operations can be found in the previous embodiments and will not be repeated here.

The computer-readable storage medium can include Read Only Memory (ROM), Random Access Memory (RAM), magnetic disks or optical discs, etc.

Since the computer programs stored in the computer-readable storage medium can execute steps in any of the lens focus methods provided by the embodiments of this application, they can achieve the beneficial effects that can be achieved by any of the lens focus methods provided by the embodiments of this application, as detailed in the previous embodiments, which will not be repeated here.

According to one aspect of this application, a computer program product or computer program is provided, wherein the computer program product or computer program includes computer instructions stored in a computer-readable storage medium. The processor of the computer device reads these computer instructions from the computer-readable storage medium, executes these computer instructions, causing the computer device to execute the above-mentioned lens focus method.

The above provides a detailed introduction to a lens focus method, apparatus, electronic device and computer-readable storage medium provided by the embodiments of this application. This text has used specific examples to elaborate the principles and implementation methods of this application. The explanation of the above embodiments is only used to help understand the methods and core ideas of this application. Meanwhile, for those skilled in the art, based on the ideas of this application, there will be changes in specific implementation methods and application scope. In conclusion, the content of this specification should not be understood as a limitation on this application.

The invention claimed is:

1. A lens focus method comprising:

obtaining a target phase difference of a preview image captured by a main camera lens in a macro shooting mode;

obtaining a calibration data set corresponding to the macro shooting mode, where the calibration data set includes calibration phase differences and calibration currents for reference calibrated macro distances, wherein the reference calibrated macro distances include multiple distances, and the reference calibrated macro distances correspond to multiple calibration phase differences and one calibration current;

performing arithmetic operations on the multiple calibration phase differences corresponding to the reference calibrated macro distances to obtain a target phase value;

selecting the calibration phase difference that matches the target phase difference from the calibration data set based on the target phase value;

determining a target current based on a calibration current corresponding to a calibration phase difference that matches the target phase difference; and driving the main camera lens to focus according to the target current.

2. The lens focus method according to claim 1, wherein driving the main camera lens to focus according to the target current comprises:

driving the main camera lens to move to a candidate position according to the target current; and adjusting the main camera lens based on the candidate position until the main camera lens reaches a target focus position.

3. The lens focus method according to claim 2, wherein adjusting the main camera lens based on the candidate position until the main camera lens reaches the target focus position comprises:

obtaining a candidate phase difference of preview image captured by the main camera lens at the candidate position;

if the candidate phase difference meets a preset phase threshold, determining that the candidate position is the target focus position, and stopping movement of the main camera lens;

if the candidate phase difference does not meet the preset phase threshold, determining that the candidate position is not the target focus position, and using a preset focusing strategy to move the main camera lens to the target focus position.

4. The lens focus method according to claim 3, wherein using the preset focusing strategy to move the main camera lens to the target focus position comprises:

obtaining a contrast difference value of preview image captured by the main camera lens at the candidate position based on the preset focusing strategy; and moving the main camera lens to the target focus position based on the contrast difference value.

5. The lens focus method according to claim 1, wherein selecting the calibration phase difference that matches the target phase difference from the calibration data set based on the target phase value comprises:

matching the target phase difference with the target phase value corresponding to each reference calibrated macro distance to obtain a target phase value matching the target phase difference; and selecting the calibration phase difference that matches the target phase difference from the calibration data set based on the target phase value matching the target phase difference.

6. The lens focus method according to claim 5, wherein the target phase value is a target phase average value;

the matching the target phase difference with the target phase value corresponding to each reference calibrated macro distance to obtain a target phase value matching the target phase difference comprises:

obtaining a matching array by arranging the target phase average values corresponding to each reference calibrated macro distance in sequence according to numerical value;

determining a numerical interval position of the target phase difference in the matching array; and determining the target phase average value matching the target phase difference based on the numerical interval position.

7. The lens focus method according to claim 6, wherein determining a numerical interval position of the target phase difference in the matching array and determining the target phase average value matching the target phase difference based on the numerical interval position comprises:

successively comparing the target phase difference with the average values in the matching array;

if the target phase difference is greater than a first average value and less than a second average value, determining a first difference value between the target phase difference and the first average value, and determining a second difference value between the target phase difference and the second average value, wherein the first average value and the second average value are two adjacent average values at the numerical interval position in the matching array;

if the absolute value of the first difference value is greater than the absolute value of the second difference value, using the second average value as the target phase average value matching the target phase difference;

if the absolute value of the first difference value is less than the absolute value of the second difference value, using the first average value as the target phase average value matching the target phase difference.

8. The lens focus method according to claim 1, wherein the target phase value is a target phase average value;

the performing arithmetic operations on the multiple calibration phase differences corresponding to the reference calibrated macro distances to obtain a target phase value comprises:

arranging multiple calibration phase differences corresponding to each reference calibrated macro distance according to preset rules to obtain an arrangement array corresponding to each reference calibrated macro distance; and calculating the target phase average value of multiple calibration phase differences corresponding to the reference calibrated macro distances based on the average value of calibration phase differences at preset positions in the arrangement array.

9. The lens focus method according to claim 1, wherein selecting the calibration phase difference that matches the target phase difference from the calibration data set based on the target phase value comprises:

determining a confidence level of the target phase difference; and if the confidence level is equal to or greater than a preset threshold, selecting the calibration phase difference that matches the target phase difference from the calibration data set based on the target phase value.

10. The lens focus method according to claim 9, further comprising after determining a confidence level of the target phase difference:

if the confidence level is less than the preset threshold, updating an acquisition count of the target phase difference;

if the acquisition count is less than or equal to a preset count, returning to execute the step of obtaining the target phase difference of the preview image captured by the main camera lens in the macro shooting mode; and if the acquisition count exceeds the preset count, using the preset focusing strategy to move the main camera lens to the target focus position.

11. The lens focus method according to claim 1, wherein obtaining the target phase difference of the preview image captured by the main camera lens in the macro shooting mode comprises:

determining multiple initial phase differences of the preview image captured by the main camera lens in the macro shooting mode; and using a maximum initial phase difference among the multiple initial phase differences as the target phase difference of the preview image.

12. The lens focus method according to claim 1, wherein obtaining the target phase difference of the preview image captured by the main camera lens in the macro shooting mode comprises:

determining multiple initial phase differences of the preview image captured by the main camera lens in the macro shooting mode; and using an average value of the multiple initial phase differences as the target phase difference of the preview image.

13. The lens focus method according to claim 1, further comprising before obtaining the calibration data set corresponding to the macro shooting mode:

obtaining multiple test macro distances in the macro shooting mode;

selecting the reference calibrated macro distances from the multiple test macro distances;

moving the main camera lens to an initial position for capturing the preview image, and photographing a subject located at the position of the reference calibrated macro distance to obtain a calibration image of the subject;

determining the calibration phase differences and the calibration currents of the reference calibrated macro distance based on the calibration image; and determining the calibration data set corresponding to the macro shooting mode based on the calibration phase differences and the calibration currents of the reference calibrated macro distance.

14. The lens focus method according to claim 13, wherein determining the calibration phase differences and the calibration currents of the reference calibrated macro distance based on the calibration image, and determining the calibration data set corresponding to the macro shooting mode based on the calibration phase differences and the calibration currents of the reference calibrated macro distance comprises:

determining the calibration phase differences corresponding to the reference calibrated macro distance based on the calibration image;

moving the main camera lens according to a moving current until the main camera lens reaches an initial focus position corresponding to the reference calibrated macro distance;

using the moving current corresponding to the initial focus position as the calibration current corresponding to the reference calibrated macro distance;

if the multiple test macro distances have not been completely selected, returning to execute the step of selecting reference calibrated macro distances from the multiple test macro distances; and if the multiple test macro distances have been completely selected, determining the calibration data set corresponding to the macro shooting mode based on the calibration phase differences and the calibration currents of the reference calibrated macro distance.

15. The lens focus method according to claim 13, further comprising before moving the main camera lens to the initial position for capturing the preview image:

selecting a maximum test macro distance and a minimum test macro distance from the multiple test macro distances; and determining the initial position based on a focus position corresponding to the maximum test macro distance and a focus position corresponding to the minimum test macro distance.

16. The lens focus method according to claim 1, further comprising before obtaining the target phase difference of the preview image captured by the main camera lens in the macro shooting mode:

determining the device type of the main camera lens; and determining the calibration data set corresponding to the macro shooting mode based on the device type.

17. An electronic device, comprising a processor and memory, wherein the memory stores computer programs, and the processor is configured to run the computer programs stored in the memory to execute the lens focus method according to claim 1.

18. A non-transitory computer-readable storage medium storing computer programs that can be loaded by a processor to execute the lens focus method according to claim 1.

* * * * *